US012196582B1

(12) United States Patent
Dai et al.

(10) Patent No.: US 12,196,582 B1
(45) Date of Patent: Jan. 14, 2025

(54) HIGH-PRECISION MULTI-POLE MAGNETOELECTRIC ENCODER

(71) Applicant: Tangshan Polytechnic University, Tangshan (CN)

(72) Inventors: Kun Dai, Tangshan (CN); Hongguo Zhang, Xianyang (CN); Xiuchun Gao, Tianjin (CN); Xinghai Li, Tangshan (CN); Zhensheng Wang, Tangshan (CN); Ruijia Dong, Tangshan (CN); Yuxin Zhang, Tangshan (CN); Chao Tian, Tangshan (CN); Shihui Dong, Shenyang (CN); Jie Yu, Tangshan (CN); Haifeng Zhang, Tangshan (CN); Yang Shao, Tangshan (CN); Jing Li, Tangshan (CN); Yanchen Chang, Tangshan (CN)

(73) Assignee: TANGSHAN POLYTECHNIC UNIVERSITY, Tangshan (CN)

( * ) Notice: Subject to any disclaimer, the term of this patent is extended or adjusted under 35 U.S.C. 154(b) by 0 days.

(21) Appl. No.: 18/929,656

(22) Filed: Oct. 29, 2024

Related U.S. Application Data

(63) Continuation of application No. PCT/CN2023/094392, filed on May 16, 2023.

(30) Foreign Application Priority Data

May 20, 2022 (CN) .......................... 202210547924.8

(51) Int. Cl.
G01D 5/24 (2006.01)
G01D 5/244 (2006.01)
G01D 5/245 (2006.01)

(52) U.S. Cl.
CPC ....... *G01D 5/2455* (2013.01); *G01D 5/24428* (2013.01); *G01D 2205/24* (2021.05); *G01D 2205/26* (2021.05)

(58) Field of Classification Search
None
See application file for complete search history.

(56) References Cited

U.S. PATENT DOCUMENTS

2013/0021025 A1* 1/2013 Krishnaiah .............. G01B 7/30
324/207.25

FOREIGN PATENT DOCUMENTS

CN 108180823 A 6/2018
CN 108426588 A 8/2018

* cited by examiner

Primary Examiner — Jas A Sanghera

(57) ABSTRACT

A high-precision multi-pole magnetoelectric encoder includes a mounting seat, a rotating shaft, a single-pole magnet ring, a single-pole signal processing board, a shielding shell, an n-pole magnet ring, an n-pole signal processing board, a housing, a conductive rubber pad, an aviation plug, bearings, copper columns, Hall components, and assembly screws. The magnetoelectric encoder improves the environmental adaptability and replaceability of the high-precision multi-pole magnetoelectric encoder by redesigning the structure of the multi-pole encoder. It eliminates errors caused by changes in the position of magnets and Hall sensors during the replacement process, reduces interference caused by the multi-pole magnet encircling the single-pole magnet, enhances resistance to electromagnetic interference, thereby increasing the detection accuracy of the magnetoelectric encoder, and improves the performance and competitiveness of the product.

9 Claims, 3 Drawing Sheets

HIGH-PRECISION MULTI-POLE MAGNETOELECTRIC ENCODER

CROSS-REFERENCE

This application is a continuation of International Patent Application No. PCT/CN2023/094392, filed May 16, 2023, which claims the priority of Chinese Patent Application No. 202210547924.8, filed May 20, 2022, both of which are herein incorporated by reference in their entirety.

TECHNICAL FIELD

The disclosure relates to the field of high-end device manufacturing, and particularly to a high-precision multi-pole magnetoelectric encoder, and is specifically for the high-precision servo position detection field, particularly for the manufacturing of servo position sensors for machine tools.

BACKGROUND

High-speed motors are widely used in various applications such as high-speed machine tools, centrifugal compressors for air conditioners or refrigerators, and hydraulic pumps. With the advancement of control theory and processor technology, the use of the high-speed motors in high-tech fields such as hybrid vehicles and high-speed flywheel energy storage systems has also become more widespread. High-precision servo control is inseparable from the position detection components of servo motors, that is, encoders.

Magnetoelectric encoders are a type of angular measurement sensor. A magnet is coaxially mounted on a shaft end of the encoder. Magnetic sensing components on an internal circuit of the encoder can detect a magnetic field generated by the magnet and convert it into a voltage value. As the shaft and the magnet rotate, the magnetic field changes periodically, which in turn produces a periodically varying electrical signal. The circuit performs subsequent processing such as analog to digital (AD) conversion, filtering, and calculation on the voltage value detected by the magnetic sensing components to output a corresponding angular value. The magnetoelectric encoders have many advantages such as small size, resistance to oil contamination, and resistance to vibration, and are increasingly being used in various industrial fields.

The magnetoelectric encoders have a wide range of applications in the field of measurement. With the accelerated development of industrialization, there are high demands for the resolution and accuracy of angular displacement sensors. To improve a resolution of an angular value of the magnetoelectric encoder, a combination of single-pole magnet and multi-pole magnet is used to enhance the resolution of the angular value. The multi-pole magnet generates a multi-cycle signal magnetic field when it rotates one full circle, while the single-pole magnet generates a single-cycle magnetic field when it rotates one full circle. An absolute position of the current angular value is determined by the single-cycle magnetic field, and the angular value signal produced by the multi-pole magnets is used to subdivide the angular value obtained by solving the single-pole signal, thereby improving the resolution of the angular value.

As referring to the Chinese patent with publication No. CN112362089A, it discloses a multi-pole magnetoelectric encoder. The encoder has a common structure for commonly used multi-pole magnetoelectric encoders. Currently, all multi-pole magnetoelectric encoders are embedded, meaning that the encoders are built into a rear end of a motor and is integrated with the motor. If the encoders are damaged in the production field, it is necessary to remove an end cover of the motor, which affects a cleanliness of a cavity interior of the motor. Moreover, a positional relationship of each magnet and Hall sensor must be maintained consistently during a replacement process; otherwise, it will produce detection errors. However, the production environment severely restricts the installation accuracy. Additionally, the multi-pole magnets are installed to encircle a single-pole magnet, which can easily affect the installation. Low-frequency interference occurs in the multi-pole Halls, and this type of the multi-pole magnetoelectric encoder lacks electromagnetic shielding structure, thus the magnetic field at the Hall is affected by the surrounding environment and the magnets on the motor shaft, which is not conducive to improving accuracy.

In response to the above problems, to enhance the environmental adaptability and replaceability of the multi-pole magnetoelectric encoder, reduce the errors caused by changes in the position of magnets and Hall sensors during the replacement process, reduce the interference caused by the multi-pole magnet encircling the single-pole magnet, and improve the resistance to electromagnetic interference, thereby increasing the detection accuracy of the magnetoelectric encoder, the disclosure provides a high-precision multi-pole magnetoelectric encoder.

SUMMARY

The disclosure provides a high-precision multi-pole magnetoelectric encoder. By redesigning a structure of the multi-pole encoder, the disclosure enhances the environmental adaptability and replaceability of the multi-pole magnetoelectric encoder. It eliminates errors caused by changes in the position of magnets and Hall sensors during a replacement process, reduces interference caused by the multi-pole magnet encircling the single-pole magnet, and improves resistance to electromagnetic interference, thereby increasing the detection accuracy of the magnetoelectric encoder. The disclosure addresses the above problems.

A high-precision multi-pole magnetoelectric encoder includes a mounting seat, a rotating shaft, a single-pole magnet ring, a single-pole signal processing board, a shielding shell, an n-pole magnet ring, an n-pole signal processing board, a housing, a conductive rubber pad, an aviation plug, bearings, copper columns, Hall components, and assembly screws. Four of the Hall components are welded at an interval of 90 degrees on a side of the single-pole signal processing board facing towards the single-pole magnet ring, two sets of Hall magnetic components are welded on a side of the n-pole signal processing board facing towards the n-pole magnet ring, the two sets of Hall magnetic components are centrally symmetric, each set of Hall magnetic components includes two of the Hall components, and the two Hall components in each set of Hall magnetic components are spaced at a multiple of 90/n degrees.

The bearings are disposed in a bearing mounting hole penetrating two sides of the mounting seat, the rotating shaft defines two elastic retaining ring grooves, the rotating shaft is disposed on the bearings, and an axial positioning of the rotating shaft is accomplished using elastic retaining rings. An inner end of the mounting seat defines first threaded holes, ones of the copper columns are fixedly connected to the mounting seat through the first threaded holes. The single-pole magnet ring is disposed on a first shaft shoulder of the rotating shaft, and the single-pole signal processing board and the ones of the copper columns are connected to the first threaded holes of the mounting seat through ones of the assembly screws. An end of the shielding shell defines a wire-passing hole, a through-hole, and second threaded holes, another end of the shielding shell is provided with a first internal thread and an external thread, and the shielding shell is fixedly connected to the mounting seat through the first internal thread. The n-pole magnet ring is disposed on a second shaft shoulder of the rotating shaft, and the n-pole signal processing board and ones of the copper columns are connected to the second threaded holes of the shielding shell through ones of the assembly screws. An end of the housing defines an aviation plug installation hole, the aviation plug is fixedly connected to the housing by pressing the conductive rubber pad into the aviation plug installation hole defined at the end of the housing with ones of the assembly screws, thereby achieving an electromagnetic shielding and enhancing an ability of the magnetoelectric encoder to resist electromagnetic interference. Another end of the housing is provided with a second internal thread, the housing is assembled with the shielding shell by matching the second internal thread of the housing with the external thread at the another end of the shielding shell.

During operation, a shaft to be measured is fixedly connected to the rotating shaft of the high-precision multi-pole magnetoelectric encoder. As the rotating shaft rotates, the rotating shaft drives the coaxially mounted single-pole magnet ring and n-pole magnet ring to rotate, thereby generating a rotating magnetic field. The Hall components on the single-pole signal processing board detect a magnetic field strength produced by the single-pole magnet ring and convert it into a voltage value. As the rotating shaft and the single-pole magnet ring rotate, the magnetic field changes periodically, resulting in a periodically varying electrical signal. The single-pole signal processing board performs subsequent processing such as AD conversion, filtering, and calculation on the voltage values detected by the Hall components, thereby outputting an absolute position of the current angular value determined by a single-cycle magnetic field.

As the n-pole magnet ring rotates, a rotating magnetic field is generated. The Hall components on the n-pole signal processing board detect a magnetic field strength produced by the n-pole magnet ring and convert it into a voltage value. As the rotating shaft and the n-pole magnet ring rotate, the magnetic field changes periodically, resulting in a periodically varying electrical signal. The n-pole signal processing board performs subsequent processing such as AD conversion, filtering, and calculation on the voltage values detected by the Hall components, thereby outputting a subdivided angular value of the current angle determined by a n-multi-cycle magnetic field.

Since the single-pole magnet ring and the n-pole magnet ring rotate coaxially with the rotating shaft, their absolute positions are consistent. The single-pole signal processing board transmits signals to the n-pole signal processing board through signal wires passing through a wire-passing hole of the shielding shell. The n-pole signal processing board uses the subdivided angular value determined by the n-multi-cycle magnetic field to perform angular subdivision on the current angular value determined by the single-cycle magnetic field, thereby improving the resolution and accuracy of the angular value. Then, the n-pole signal processing board connects to the aviation plug through the signal wires to complete the external output of the angle.

In an embodiment, the shielding shell is fixedly connected to the mounting seat through the first internal threads, and a contact area between the end of the shielding shell and the end of the mounting seat is coated with silver-filled conductive adhesive, which makes a sealing performance of the joint between the shielding shell and the mounting seat better and further improves the electromagnetic shielding effect of the disclosure.

In an embodiment, the housing is fixedly connected to the mounting seat and the shielding shell through the second internal threads, a contact area between the end of the housing and the another end of the mounting seat is coated with silver-filled conductive adhesive, which makes the sealing performance of the joint between the housing and the mounting seat better, and further improves the electromagnetic shielding effect of the disclosure.

In an embodiment, a diameter of the wire-passing hole in the shielding shell is 5 millimeters (mm).

In an embodiment, the single-pole signal processing board passes through the wire-passing hole of the shielding shell using signal wires, and the wire-passing hole is sealed with silver-filled conductive adhesive, which results in better electromagnetic shielding effect between the single-pole magnet ring and the n-pole magnet ring.

In an embodiment, the mounting seat, the shielding shell, and the housing utilize high permeability magnetic materials with a magnetic permeability greater than 100 ampere per meter (H/m), which improves a shielding ability of the high-precision multi-pole magnetoelectric encoder against the external magnetoelectric signal interference.

In an embodiment, the high permeability magnetic materials used in the mounting seat and the housing are same, and the high permeability magnetic material used in the shielding shell is different from the high permeability magnetic material used in the mounting seat and the housing, which further improves the shielding ability of the high-precision multi-pole magnetoelectric encoder against the external magnetoelectric signal interference with different wavelengths.

In an embodiment, a radial gap is defined between the shielding shell and the housing, and the radial gap is in a range of 1 mm to 5 mm.

In an embodiment, an outer end of the mounting seat defines threaded holes for the installation of the encoder and an external bracket.

The beneficial effects of the disclosure are as follows.

The disclosure improves the environmental adaptability and replaceability of the high-precision multi-pole magnetoelectric encoder by redesigning the structure of the multi-pole encoder. It eliminates errors caused by changes in the position of magnets and Hall sensors during the replacement process, reduces interference caused by installing the multi-pole magnets to encircle the single-pole magnet, enhances resistance to electromagnetic in interference, thereby increasing the detection accuracy of the magnetoelectric encoder, and improves the performance and competitiveness of the product.

BRIEF DESCRIPTION OF DRAWINGS

The disclosure will be further described in detail with reference to the attached drawings and specific embodiments.

Figure 1:
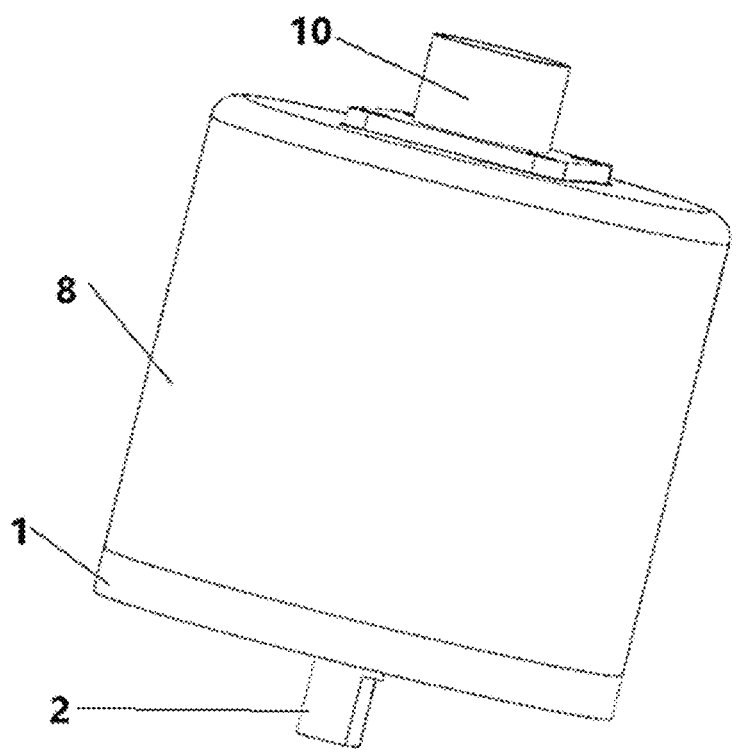
FIG. 1 illustrates a schematic structural diagram of a high-precision multi-pole magnetoelectric encoder in the disclosure.

DESCRIPTION OF REFERENCE NUMERALS 1. mounting seat; 101. bearing mounting hole; 102. first threaded hole; 2. rotating shaft; 201. first shaft shoulder; 202. second shaft shoulder; 3. single-pole magnet ring; 4. single-pole signal processing board; 5. shielding shell; 501. through-hole; 502. second threaded hole; 503. first internal thread; 504. external thread; 6. n-pole magnet ring; 7. n-pole signal processing board; 8. housing; 801. aviation plug installation hole; 802. second internal thread; 9. conductive rubber pad; 10. aviation plug; 11. bearing; 12. copper column; 13. Hall component; 14. assembly screw; 15. elastic retaining ring groove; 16. elastic retaining ring; 17. radial gap; 18. threaded hole; 19. wire-passing hole.

DETAILED DESCRIPTION OF EMBODIMENTS

The following description, in conjunction with the attached drawings of the embodiments of the disclosure, provides a clear and comprehensive description of the technical solution in the embodiments of the disclosure. It is evident that the described embodiments are merely some of embodiments of the disclosure and not all embodiments. All other embodiments obtained by those skilled in the art without creative effort based on the embodiments of the disclosure fall within the scope of protection of the disclosure.

Embodiment 1

Figure 2:
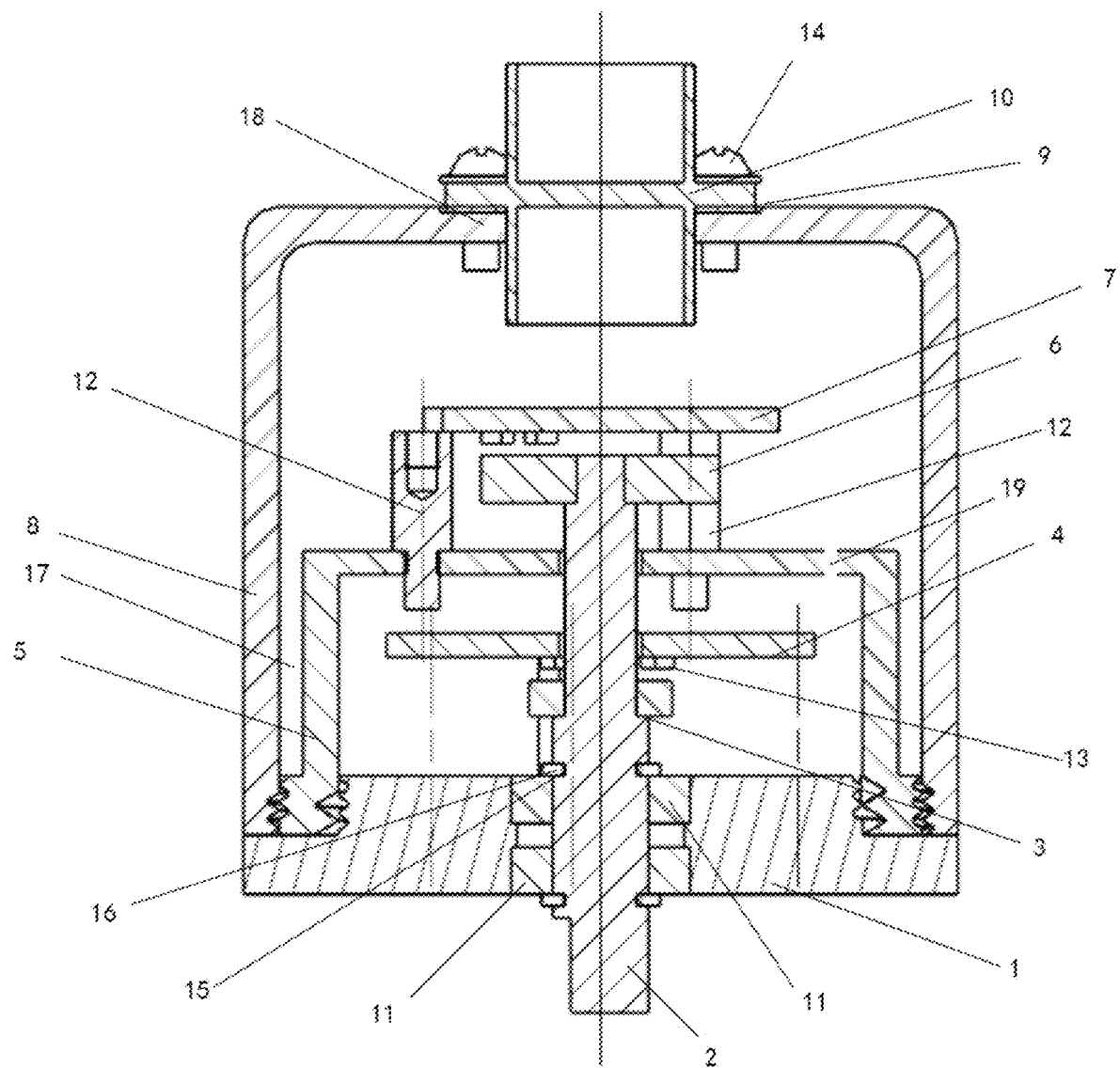
FIG. 2 illustrates a cross-sectional view of the high-precision multi-pole magnetoelectric encoder in the disclosure.
Figure 3:
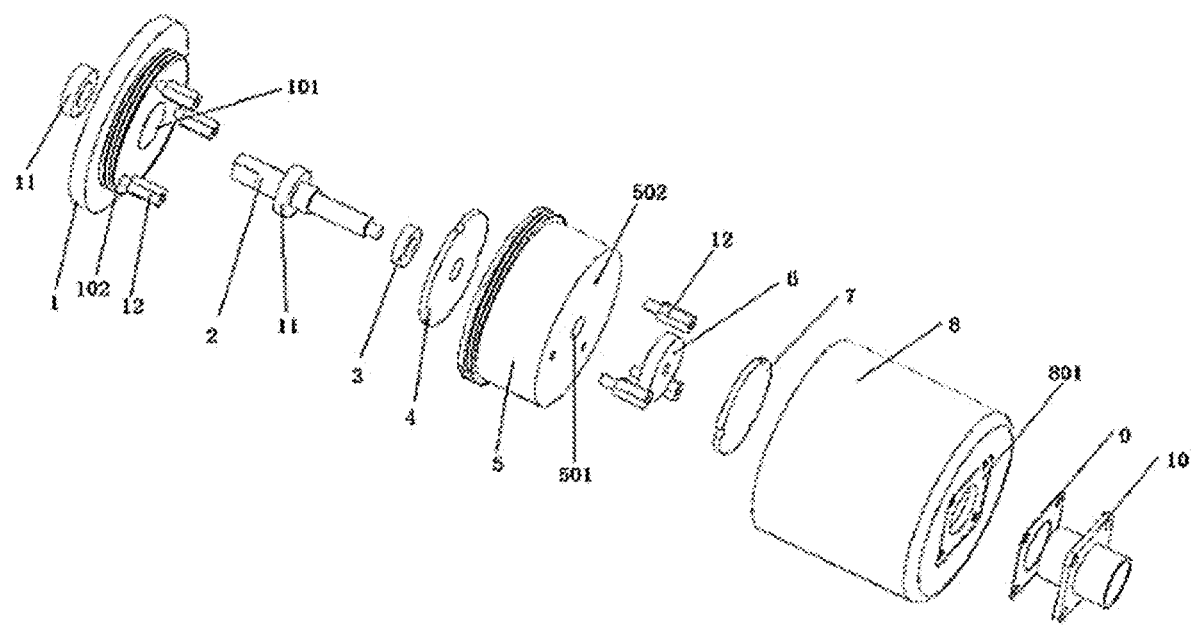
FIG. 3 illustrates an exploded view of the high-precision multi-pole magnetoelectric encoder in the disclosure.
Figure 4:
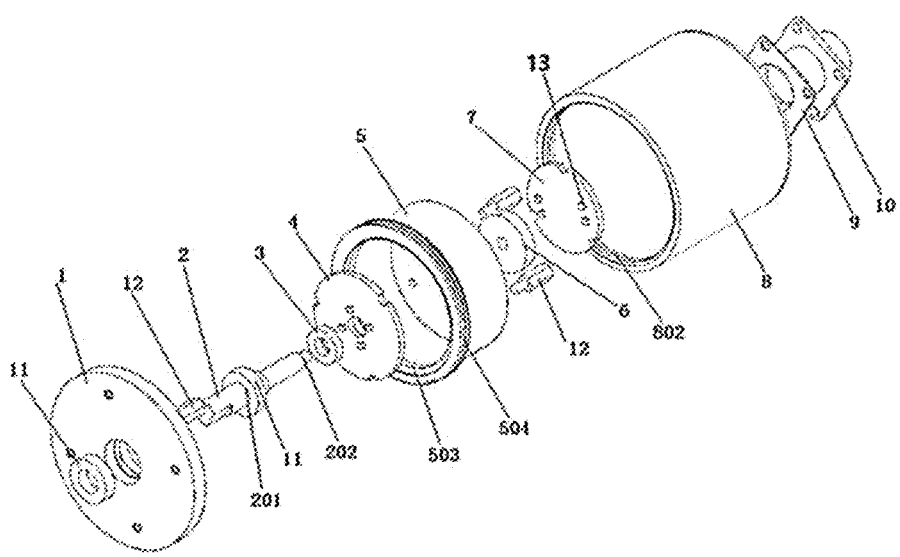
FIG. 4 illustrates another exploded view of the high-precision multi-pole magnetoelectric encoder in the disclosure.

As shown in FIGS. 1-4, a high-precision multi-pole magnetoelectric encoder includes a mounting seat 1, a rotating shaft 2, a single-pole magnet ring 3, a single-pole signal processing board 4, a shielding shell 5, an n-pole magnet ring 6, an n-pole signal processing board 7, a housing 8, a conductive rubber pad 9, an aviation plug 10, bearings 11, copper columns 12, Hall components 13, and assembly screws 14. The four Hall components 13 are welded at an interval of 90 degrees on a side of the single-pole signal processing board 4 facing towards the single-pole magnet ring 3, two sets of Hall magnetic components are welded on a side of the n-pole signal processing board 7 facing towards the n-pole magnet ring 6, the two sets of Hall magnetic components are centrally symmetric, each set of Hall magnetic components includes the two Hall components 13, and the two Hall components 13 in each set of Hall magnetic components are spaced at a multiple of 90/n degrees.

The bearings 11 are disposed in a bearing mounting hole 101 penetrating two sides of the mounting seat 1, the rotating shaft 2 defines two elastic retaining ring grooves 15, the rotating shaft 2 is disposed on the bearings 11, and an axial positioning of the rotating shaft 2 is accomplished using elastic retaining rings 16. An inner end of the mounting seat 1 defines first threaded holes 102, the copper columns 12 are fixedly connected to the mounting seat 1 through the first threaded holes 102. The single-pole magnet ring 3 is disposed on a first shaft shoulder 201 of the rotating shaft 2, and the single-pole signal processing board 4 and the copper columns 12 are connected to the first threaded holes 102 of the mounting seat 1 through the assembly screws 14. An end of the shielding shell 5 defines a wire-passing hole 19, a through-hole 501, and second threaded holes 502, another end of the shielding shell 5 is provided with a first internal thread 503 and an external thread 504, and the shielding shell 5 is fixedly connected to the mounting seat 1 through the first internal thread 503. The n-pole magnet ring 6 is disposed on a second shaft shoulder 202 of the rotating shaft 2, and the n-pole signal processing board 7 and the copper columns 12 are connected to the second threaded holes 502 of the shielding shell 5 through the assembly screws 14. An end of the housing 8 defines an aviation plug installation hole 801, the aviation plug 10 is fixedly connected to the housing 8 by pressing the conductive rubber pad 9 into the aviation plug installation hole 801 defined at the end of the housing 8 with the assembly screws 14, thereby achieving an electromagnetic shielding and enhancing an ability of the magnetoelectric encoder to resist electromagnetic interference. Another end of the housing 8 is provided with a second internal thread 802, the housing 8 is assembled with the shielding shell 5 by matching the second internal thread 802 of the housing 8 with the external thread 504 at the another end of the shielding shell 5.

Embodiment 2

Compared to the embodiment 1 of the high-precision multi-pole magnetoelectric encoder, a high-precision multi-pole magnetoelectric encoder further includes following features. The shielding shell 5 is fixedly connected to the mounting seat 1 through the first internal threads 503, and a contact area between the end of the shielding shell 5 and the end of the mounting seat 1 is coated with silver-filled conductive adhesive. The housing 8 is fixedly connected to the mounting seat 1 and the shielding shell 5 through the second internal threads 802, a contact area between the end of the housing 8 and the another end of the mounting seat 1 is coated with silver-filled conductive adhesive. A diameter of the wire-passing hole 19 in the shielding shell 5 is 5 mm. The single-pole signal processing board 4 passes through the wire-passing hole 19 of the shielding shell 5 using signal wires, and the wire-passing hole 19 is sealed with silver-filled conductive adhesive, which makes a sealing performance of the joint surface better, further enhancing the electromagnetic shielding effect of the disclosure. The mounting seat 1, the shielding shell 5, and the housing 8 utilize high permeability magnetic materials with a magnetic permeability greater than 100 H/m, which improves a shielding ability of the high-precision multi-pole magnetoelectric encoder against the external magnetoelectric signal interference.

Embodiment 3

Compared to the embodiment 2, the high permeability magnetic materials used in the mounting seat 1 and the housing 8 are same, and the high permeability magnetic material used in the shielding shell 5 is different from the high permeability magnetic material used in the mounting seat 1 and the housing 8, which further improves the shielding ability of the high-precision multi-pole magnetoelectric encoder against the external magnetoelectric signal interference with different wavelengths through different type of the high permeability magnetic materials. A radial gap 17 is defined between the shielding shell 5 and the housing 8, and the radial gap 17 is in a range of 1 mm to 5 mm. By setting the radial gap 17 between different high permeability magnetic materials, the shielding performance against the external magnetoelectric signal interference with different wavelengths is further improved. The high permeability magnetic material has a magnetic permeability greater than 100 H/m. An outer end of the mounting seat 1 defines threaded holes 18 for the installation of the encoder and an external bracket.

During operation, a shaft to be measured is fixedly connected to the rotating shaft 2 of the high-precision multi-pole magnetoelectric encoder. As the rotating shaft 2 rotates, the rotating shaft 2 drives the coaxially mounted single-pole magnet ring 3 and n-pole magnet ring 6 to rotate, thereby generating a rotating magnetic field. The Hall components 13 on the single-pole signal processing board 4 detect a magnetic field strength produced by the single-pole magnet ring 3 and convert it into a voltage value. As the rotating shaft 2 and the single-pole magnet ring 3 rotate, the magnetic field changes periodically, resulting in a periodically varying electrical signal. The single-pole signal processing board 4 performs subsequent processing such as AD conversion, filtering, and calculation on the voltage values detected by the Hall components 13, thereby outputting an absolute position of the current angular value determined by a single-cycle magnetic field.

As the n-pole magnet ring 6 rotates, a rotating magnetic field is generated. The Hall components 13 on the n-pole signal processing board 7 detect a magnetic field strength produced by the n-pole magnet ring 6 and convert it into a voltage value. As the rotating shaft 2 and the n-pole magnet ring 6 rotate, the magnetic field changes periodically, resulting in a periodically varying electrical signal. The n-pole signal processing board 7 performs subsequent processing such as AD conversion, filtering, and calculation on the voltage values detected by the Hall components 13, thereby outputting a subdivided angular value of the current angle determined by a n-multi-cycle magnetic field.

Since the single-pole magnet ring 3 and the n-pole magnet ring 6 rotate coaxially with the rotating shaft 2, their absolute positions are consistent. The single-pole signal processing board 4 transmits signals to the n-pole signal processing board 7 through signal wires passing through the wire-passing hole 19 of the shielding shell 5. The n-pole signal processing board 7 uses the subdivided angular value determined by the n-multi-cycle magnetic field to perform angular subdivision on the current angular value determined by the single-cycle magnetic field, thereby improving the resolution and accuracy of the angular value. Then, the n-pole signal processing board 7 connects to the aviation plug 10 through the signal wires to complete the external output of the angle.

It should be noted that in the disclosure, relational terms such as "first" and "second" are merely used to distinguish one entity or operation from another, and do not necessarily require or imply that there is any such actual relationship or order between these entities or operations. Moreover, the terms "contain," "involve," "include," "have," or any other variations thereof are intended to encompass non-exclusive inclusion, so that a process, method, item, or device that includes a series of elements includes not only those elements but also other elements that are not expressly listed, or includes elements that are inherent to such a process, method, item, or device.

Although embodiments of the disclosure have been shown and described, it will be appreciated by those skilled in the art that various modifications, substitutions, and alterations may be made to these embodiments without departing from the principles and spirit of the disclosure. The scope of the disclosure is defined by the appended claims and their equivalents.

What is claimed is:

1. A high-precision multi-pole magnetoelectric encoder, comprising:
    a mounting seat (1), a rotating shaft (2), a single-pole magnet ring (3), a single-pole signal processing board (4), a shielding shell (5), an n-pole magnet ring (6), an n-pole signal processing board (7), a housing (8), a conductive rubber pad (9), an aviation plug (10), bearings (11), copper columns (12), Hall components (13), and assembly screws (14);
    wherein four of the Hall components (13) are welded at an interval of 90 degrees on a side of the single-pole signal processing board (4) facing towards the single-pole magnet ring (3), two sets of Hall magnetic components (13) are welded on a side of the n-pole signal processing board (7) facing towards the n-pole magnet ring (6), the two sets of Hall magnetic components are centrally symmetric, each set of Hall magnetic components comprises two of the Hall components (13), and the two Hall components (13) in each set of Hall magnetic components are spaced at a multiple of 90/n degrees;
    wherein the bearings (11) are disposed in a bearing mounting hole (101) penetrating two sides of the mounting seat (1), the rotating shaft (2) defines two elastic retaining ring grooves (15), the rotating shaft (2) is disposed on the bearings (11), and an axial positioning of the rotating shaft (2) is accomplished using elastic retaining rings (16);
    wherein an inner end of the mounting seat (1) defines first threaded holes (102), ones of the copper columns (12) are fixedly connected to the mounting seat (1) through the first threaded holes (102); the single-pole magnet ring (3) is disposed on a first shaft shoulder (201) of the rotating shaft (2), and the single-pole signal processing board (4) and the ones of the copper columns (12) are connected to the first threaded holes (102) of the mounting seat (1) through ones of the assembly screws (14);
    wherein an end of the shielding shell (5) defines a wire-passing hole (19), a through-hole (501), and second threaded holes (502), another end of the shielding shell (5) is provided with a first internal thread (503) and an external thread (504), and the shielding shell (5) is fixedly connected to the mounting seat (1) through the first internal thread (503); the n-pole magnet ring (6) is disposed on a second shaft shoulder (202) of the rotating shaft (2), and the n-pole signal processing board (7) and ones of the copper columns (12) are connected to the second threaded holes (502) of the shielding shell (5) through ones of the assembly screws (14);
    wherein an end of the housing (8) defines an aviation plug installation hole (801), the aviation plug (10) is fixedly connected to the housing (8) by pressing the conductive rubber pad (9) into the aviation plug installation hole (801) defined at the end of the housing (8) with ones of the assembly screws (14), thereby achieving an electromagnetic shielding and enhancing an ability of the magnetoelectric encoder to resist electromagnetic interference; another end of the housing (8) is provided with a second internal thread (802), the housing (8) is assembled with the shielding shell (5) by matching the second internal thread (802) of the housing (8) with the external thread (504) at the another end of the shielding shell (5), and the two Hall components (13) in each set of Hall magnetic components are spaced at 90/n degrees.

2. The high-precision multi-pole magnetoelectric encoder as claimed in claim 1, wherein the shielding shell (5) is fixedly connected to the mounting seat (1) through the first internal threads (503), and a contact area between the end of the shielding shell (5) and the end of the mounting seat (1) is coated with silver-filled conductive adhesive.

3. The high-precision multi-pole magnetoelectric encoder as claimed in claim 2, wherein the housing (8) is fixedly connected to the mounting seat (1) and the shielding shell (5) through the second internal threads (802), a contact area between the end of the housing (8) and the another end of the mounting seat (1) is coated with silver-filled conductive adhesive.

4. The high-precision multi-pole magnetoelectric encoder as claimed in claim 3, wherein a diameter of the wire-passing hole (19) in the shielding shell (5) is 5 millimeters (mm).

5. The high-precision multi-pole magnetoelectric encoder as claimed in claim 4, wherein the single-pole signal processing board (4) passes through the wire-passing hole (19) of the shielding shell (5) using signal wires, and the wire-passing hole (19) is sealed with silver-filled conductive adhesive.

6. The high-precision multi-pole magnetoelectric encoder as claimed in claim 5, wherein the mounting seat (1), the shielding shell (5), and the housing (8) utilize high permeability magnetic materials with a magnetic permeability greater than 100 ampere per meter (H/m).

7. The high-precision multi-pole magnetoelectric encoder as claimed in claim 6, wherein the high permeability magnetic materials used in the mounting seat (1) and the housing (8) are same, and the high permeability magnetic material used in the shielding shell (5) is different from the high permeability magnetic material used in the mounting seat (1) and the housing (8).

8. The high-precision multi-pole magnetoelectric encoder as claimed in claim 7, wherein a radial gap (17) is defined between the shielding shell (5) and the housing (8), and the radial gap (17) is in a range of 1 mm to 5 mm.

9. The high-precision multi-pole magnetoelectric encoder as claimed in claim 8, wherein an outer end of the mounting seat (1) defines threaded holes (18).

\* \* \* \* \*